United States Patent
Stephan et al.

(10) Patent No.: US 8,678,804 B2
(45) Date of Patent: Mar. 25, 2014

(54) APPARATUS FOR THE CONTINUOUS MODIFICATION OF POLYMERS IN THE FREE-FLOWING STATE BY MEANS OF ELECTRON RADIATION

(75) Inventors: Michael Stephan, Dresden (DE); Gert Heinrich, Hannover (DE); Helmut Dorschner, Dresden (DE)

(73) Assignee: Leibniz-Institut fuer Polymerforschung Dresden E.V., Dresden (DE)

( * ) Notice: Subject to any disclaimer, the term of this patent is extended or adjusted under 35 U.S.C. 154(b) by 683 days.

(21) Appl. No.: 12/088,512

(22) PCT Filed: Sep. 5, 2006

(86) PCT No.: PCT/EP2006/066026
§ 371 (c)(1),
(2), (4) Date: May 29, 2008

(87) PCT Pub. No.: WO2007/039380
PCT Pub. Date: Apr. 12, 2007

(65) Prior Publication Data
US 2008/0248149 A1 Oct. 9, 2008

(30) Foreign Application Priority Data
Sep. 30, 2005 (DE) .................... 10 2005 048 189

(51) Int. Cl.
*B01J 19/08* (2006.01)
(52) U.S. Cl.
USPC ................... 425/174.4; 264/470; 264/494
(58) Field of Classification Search
USPC .................. 264/470, 494; 425/174.4
See application file for complete search history.

(56) References Cited

U.S. PATENT DOCUMENTS

| 3,515,625 | A | * | 6/1970 | Sedlak et al. | 428/317.9 |
| 3,872,194 | A | * | 3/1975 | Lowry et al. | 264/470 |
| 3,953,557 | A | * | 4/1976 | Brax et al. | 264/456 |
| 4,525,257 | A | | 6/1985 | Kurtz | |

(Continued)

FOREIGN PATENT DOCUMENTS

| DE | 199 30 742 A1 | 2/2001 |
| DE | 101 51 823 A1 | 5/2003 |

(Continued)

OTHER PUBLICATIONS

English Language Abstract of DE 199 30 742 A1.

(Continued)

*Primary Examiner* — Amjad Abraham
(74) *Attorney, Agent, or Firm* — Greenblum & Bernstein, P.L.C.

(57) ABSTRACT

An apparatus for the continuous modification of polymers in the flowable state by electron radiation, includes a device configured for converting polymers into the flowable state, a forming device and at least one irradiation device structured and arranged to provide electron radiation in a region of irradiation. Additionally, the apparatus includes at least one cooling device, a radiation guard and supply and discharge lines inside the radiation guard. The supply and discharge lines realize a continuous transport of the polymers in the flowable state at least through the radiation guard into the region of irradiation. Additionally, the supply and discharge lines realize a continuous transport of one of polymers remaining in the flowable state and modified at least inside the radiation guard and solid formed and modified polymers out of the region of the irradiation.

15 Claims, 3 Drawing Sheets

(56) References Cited

U.S. PATENT DOCUMENTS

| | | | |
|---|---|---|---|
| 4,810,435 A * | 3/1989 | Kamada et al. | 264/485 |
| 5,916,929 A * | 6/1999 | Knobel et al. | 522/155 |
| 6,398,993 B1 * | 6/2002 | Yushio et al. | 264/40.7 |

FOREIGN PATENT DOCUMENTS

| | | | | |
|---|---|---|---|---|
| EP | 0 490 854 B1 | 6/1992 | | |
| EP | 490854 A2 * | 6/1992 | | C08L 23/06 |
| EP | 0 519 386 A1 | 12/1992 | | |
| GB | 1 348 911 | 3/1974 | | |
| GB | 1348911 A * | 3/1974 | | C08F 1/24 |
| GB | 1 496 347 | 12/1977 | | |
| JP | 53-143796 | 12/1978 | | |

OTHER PUBLICATIONS

English Language Abstract of DE101 51 823 A1.
IAEA-TECDOC-1386: Emerging Applications of Radiation Processing. Proceedings of a Technical Meeting held in Vienna, Apr. 28-30, 2003.
A. Heger: Technologie der Strahlenchemie von Polymeren. Hanser, Munich, Vienna 1990.
M. Dole: The Radiation Chemistry of Macromolecules. Academic Press, Inc., New York, 1972.
T. Seguchi: Radiation Physics and Chemistry 57 (2000) 367-371.
A. Oshima et al.: IRaP2004-6$^{th}$, International Symposium on Ionizing Radiation and Polymers, Sep. 25-30, 2004, Houffalize, Belgium.
G. Wu et al.: Journal of Polymer Science: Part A: Polymer Chemistry, vol. 37, 1541-1548 (1999).
G. Takashika et al.: Radiation Physics and Chemistry 55 (1999) 399-408.
U. Lappan et al.: Nuclear Instruments and Methods in Physics Research B: 185 (2001) 178-183.
M. Stephan et al.: MODEST2004, 3$^{rd}$ International Conference on Polymer Modification, Degradation and Stabilization , Aug./Sep. 2004, Lyon, France.
M. Stephan et al.: 11$^{th}$ International Conference on Polymeric Materials 2004, Sep. 29-Oct. 1, 2004, Halle/Saale, Germany 4-10.
Werner Hofmann: Rubber Technology Handbook. Oxford University Press, New York, 1989.

* cited by examiner

APPARATUS FOR THE CONTINUOUS MODIFICATION OF POLYMERS IN THE FREE-FLOWING STATE BY MEANS OF ELECTRON RADIATION

CROSS-REFERENCE TO RELATED APPLICATIONS

The present application is a U.S. National Stage Application of International Application No. PCT/EP2006/066026 filed Sep. 5, 2006, which published as WO 2007/039380 A1 on Apr. 12, 2007, the disclosure of which is expressly incorporated by reference herein in its entirety. Further, the present application claims priority under 35 U.S.C. §119 and §365 of German Application No. DE 10 2005 048 189.2 filed Sep. 30, 2005.

BACKGROUND OF THE INVENTION

1. Field of the Invention

The invention relates to the fields of polymer chemistry and polymer processing and relates to a device for the continuous modification of polymers in the flowable state by electron radiation that can be processed into molded articles or semi-finished products before, during and after modification.

2. Description of Background Information

Electron irradiation today, both in the bench scale as well as in industrial application, is a very efficient method for modifying the structure and properties of polymers and plastics. [IAEA-TECDOC-1386: Emerging Applications of Radiation Processing. Proceedings of a Technical Meeting held in Vienna, 28-30 Apr. 2003; A. Heger: Technologie der Strahlenchemie von Polymeren. Hanser, Munich, Vienna 1990; M. Dole: The Radiation Chemistry of Macromolecules. Academic Press, Inc., New York, 1972]. The polymeric materials to be modified are thereby in the solid state before, during and after electron irradiation.

In the meantime, laboratory tests have shown that electron irradiation of polymers in the flowable state, i.e., in the melted state (and thus at increased temperatures), can lead to novel modification effects [T. Seguchi: Radiation and Physics and Chemistry 57 (2000) 367-371; A. Oshima et al.: IRaP2004-$6^{th}$, International Symposium on Ionizing Radiation and Polymers, Sep. 25-30, 2004, Houffalize, Belgium; G. Wu et al.: Journal of Polymer Science: Part A: Polymer Chemistry, Vol. 37, 1541-1548 (1999); K. Takashika et al.: Radiation Physics and Chemistry 55 (1999) 399-408; U. Lappan et al.: Nuclear Instruments and Methods in Physics Research B: 185 (2001) 178-183, M. Stephan et al.: MODES T2004, $3^{rd}$ International Conference on Polymer Modification, Degradation and Stabilization, August/September 2004, Lyon, France; M. Stephan et al.: 11 th International Conference on Polymeric Materials 2004, Sep. 29.-Oct. 1, 2004, Halle/Saale, Germany 4-10].

For the laboratory-sized implementation of melt irradiation of this type, special irradiation vessels were built [DE 199 30 742 A1; DE 101 51 823 A1], with which a batch method is possible. However, with this arrangement the melting of the polymers occurs before and separately from the electron irradiation. That is, after the complete melting of the polymer sample, it is thereby irradiated inside an irradiation vessel. During the irradiation, the polymer sample is transported once or several times under the electron beam until the desired radiation dosage has been achieved. Subsequently, the electron accelerator is switched off and the polymer sample, now solidified again, can be removed from the irradiation vessel. However, this batch method is unsuitable for the industrial implementation of a melt irradiation.

Furthermore, a method for the continuous coating of electric cables with cross-linked polyethylene has been described in JP 53143796. As disclosed in JP 53143796, a metallic conductor as the core is guided downwards by a capstan and encased in a polyethylene melt produced in an extruder. From there, the coated conductor is guided downwards in a separate container, in which an electron irradiation is carried out under nitrogen atmosphere. However, due to the process control and device arrangement, the polyethylene coating of the metallic conductor is no longer in a flowable state at the time of the electron irradiation. As such, the application of this technology to other uses and manufacturing processes is not possible either.

U.S. Pat. No. 4,525,257 discloses a method for producing long-chain branched linear row-density polyethylene (LLDPE) by ionizing radiation, wherein the irradiation of the LLDPE also takes place as polymer melt in the extruder or during extrusion. However, the disadvantage is that devices for realizing this method are not disclosed.

A method for producing cross-linked polyethylene by irradiation using UV-light and an irradiation device is known from EP 0 490 854 B1. As disclosed by EP 0 490 854 B1, the irradiation device comprises an extruder with a forming device and a cover, within which a UV lamp is located. The hot, not yet solidified polyethylene melt is guided through on a transport belt inside the cover under the UV lamp and cross-linked thereby. However, this device is unsuitable for an irradiation with accelerated electrons, in particular, for reasons of radiation safety.

SUMMARY OF THE INVENTION

The aim of the invention is to disclose a device for the continuous modification of polymers in the flowable state by means of electron irradiation, in which the combination of melt production and modification takes place in a continuous method and leads to improved properties of the polymers.

In accordance with aspects of the invention, the aim is attained through the invention disclosed in the independent claims. Advantageous embodiments are the subject of the dependent claims.

According to the invention, a system for the continuous modification of polymers in the flowable state by electron irradiation comprises a device component for converting the polymers into the flowable state, a radiation guard for an electron irradiation and cooling devices. Additionally, in embodiments, the system comprises further treatment or further processing devices. At least one irradiation device for electron irradiation as well as supply and discharge lines are present inside the radiation guard. The supply and discharge lines realize a continuous transport of the flowable polymers at least through the radiation guard into the region of the irradiation and a continuous transport of the polymers remaining flowable and modified at least inside the radiation guard or solid formed and modified polymers out of the region of the irradiation. In the case of the production of solid formed and modified polymers inside the radiation guard, at least one more forming device is present inside the radiation guard, and the flowable polymers after the forming device are present floating freely in space in the region of the irradiation.

Advantageously, the device component for converting the polymers into the flowable state is an extruder, an internal mixer or a synthesis reactor.

Furthermore, advantageously, the device component for converting the polymers into the flowable state is arranged outside the radiation guard.

Likewise, advantageously, the radiation guard is made of a material of elements having a high atomic number, such as iron, lead or tungsten, or of concrete.

It is also advantageous if an irradiation device is arranged above and/or below and/or to the side of the irradiation region.

And, it is also advantageous if a radiation window is located inside the radiation guard above, below or next to the irradiation region.

It is furthermore advantageous if draw-off devices and cooling devices are present inside the radiation guard.

It is likewise advantageous if rollers are present as draw-off devices and cooling devices.

It is also advantageous if, inside or outside the radiation guard, devices are present for pelletizing, winding, severing and/or further transporting.

Furthermore, it is advantageous if pipes are present for transporting the flowable polymers.

It is likewise advantageous if the supply and discharge lines can be heated.

It is also advantageous if a gear pump is arranged after the device component for converting the polymers into the flowable state.

It is also advantageous if the arrangement of the openings in the radiation guard for the supply and discharge lines does not permit any direct optical view of the irradiation region.

It is furthermore advantageous if, in the case of the polymers remaining flowable and modified at least inside the radiation guard, the irradiation device is an irradiation chamber with a radiation window inside the radiation guard, inside which the modification of the flowable polymers takes place. More advantageously, the irradiation chamber contains transport and/or mixing devices and/or through its geometric dimensions, the irradiation chamber generates a melt profile of the flowable polymers in the irradiation chamber. The melt profile advantageously has a rectangular cross section, and the flowable polymers have a film-like form in the region of the irradiation.

It is likewise advantageous if the radiation guard with the supply and discharge lines is integrated into the continuous production process for polymers.

With the solution according to the invention, the technologies known per se of the preparation and processing of polymers are combined with the electron beam technology. That is, the partial processes of "production of the flowable state" and "electron irradiation of the polymers" are combined according to the invention into a continuous direct method in one device.

The advantage of this solution according to the invention is in particular that the time/space separation of the preparation and processing of polymers from the electron irradiation, that was previously usual and associated with high cost, is omitted. It is also advantageous that the melt irradiation leading to extraordinary material properties takes place in the electron irradiator without an additional melting process, which is necessary with the method according to the prior art.

With the solution according to the invention, only the absolutely necessary device components are positioned inside the complex radiation guard for an electron irradiation, and the process of producing modified polymers is thus not interrupted, but only drawn apart. For example, the device components for converting the polymers into the molten state and processing (and further processing devices) can easily be arranged outside the radiation guard. However, correspondingly complex supply and discharge lines are then necessary for a still flowable polymer melt for this purpose. Moreover, these supply and discharge lines must be guided through the radiation guard without losing their function.

Furthermore, in the case of drawing apart the process, the transport of the polymers in the flowable and/or solid state must also be ensured. Gear pumps can advantageously be used for this purpose. The gear pumps, for example, press the flowable polymers from an extruder to the irradiation region through the supply lines and/or also press the modified still flowable polymers from the irradiation region towards the exterior of the radiation guard for further treatment.

A particular advantage of the solution according to the invention is that, in the case of the modification of polymers after a forming, the irradiation is carried out in the irradiation region, while the formed still flowable polymers float freely in space after the forming tool and up to a further downstream tool. The irradiation can thus be carried out uniformly and a separation of the modified polymers from a carrier is not necessary.

The irradiation of the flowable polymers from different directions in space is also possible, depending on where and how many irradiation devices are present inside the radiation guard. In particular, polymers in larger thicknesses can thus be modified in a sufficiently uniform manner, or the modification can be implemented only in desired regions of the polymers.

With the device according to the invention, modified polymers can be produced as finished products or as semifinished products. For example, if the polymer modification is the generation of a high radiation cross-linking, the forming of the melt into a finished product must imperatively occur before the irradiation, since in the case of a cross-linking of this type of the polymers, a subsequent forming of the melt is no longer possible. However, if the electron irradiation produces modification effects without molecular cross-linkings (or only branchings or low partial cross-linking), the forming of the melt can also take place after the irradiation. In the case of the production of semifinished products, a modification of the polymers is achieved with the irradiation, which renders possible a subsequent final forming or further processing. For example, pellets may be produced with the device according to the invention as semifinished products from the modified polymers, which pellets are then further processed.

The irradiations leading to uncrosslinked, branched or only partially cross-linked modification products can take place in the electron beam in a special irradiation chamber. In the chamber, the flowing polymer melt is transported axially (and preferably radially intermixed and homogenized) in a defined manner by rotating screw flights of differing geometries.

The irradiations leading to uncrosslinked, branched or only partially cross-linked modification products can also take place in the electron beam in a special irradiation chamber. Within the chamber, the flowing polymer melt flows through the radiation field as a defined melt profile.

BRIEF DESCRIPTION OF THE DRAWINGS

The invention is described below in more detail based on several exemplary embodiments. They show.

DETAILED DESCRIPTION OF THE INVENTION

Example 1

Figure 1:
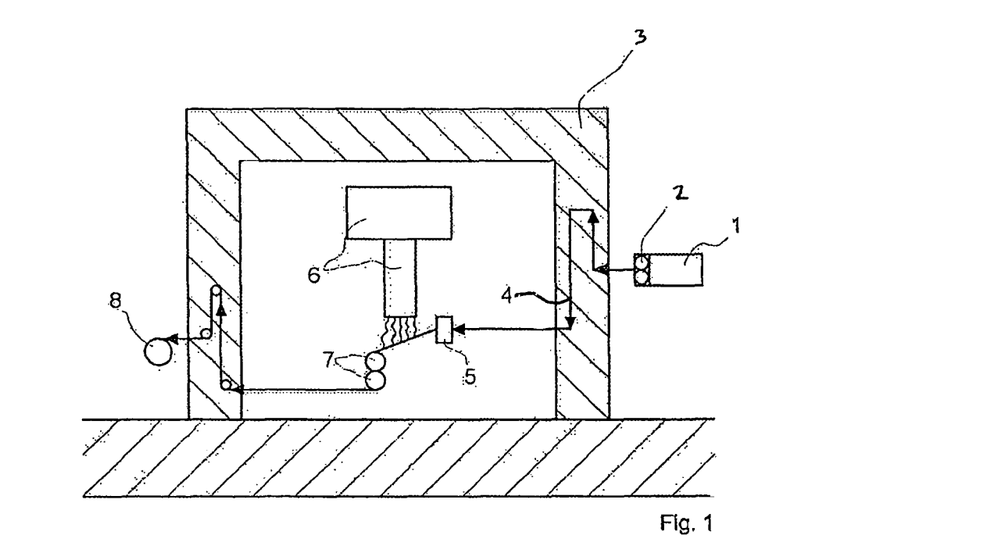
FIG. 1 The continuous production process and electron irradiation process of melt films, FIG. 2 The continuous production and electron irradiation process of melt threads, FIG. 3 The continuous production and electron irradiation process of melt tubes, FIG. 4 The continuous production and electron irradiation process of pellets with intermixing during the irradiation, and FIG. 5 The continuous production and electron irradiation process of pellets.

FIG. 1 shows a first exemplary embodiment of the invention. As shown in FIG. 1, pellets or powders of thermoplastics are melted in the usual manner in a single-screw extruder (1) and outside a local radiation guard (3), which was directly integrated into a conventional production process for flat-film production. The polymer melt is transported through the rotating extruder screw inside the single-screw extruder (1) downstream to the inflow opening of a melt gear pump (2). This melt gear pump (2) builds up the necessary melt pressure for the transport of the hot polymer melt through the heated melt line (4) integrated in the local radiation guard (3) up to the slot die of a conventional flat-film forming tool (5) inside the local radiation guard (3). The melt gear pump (2) also guarantees a constant melt throughput. The flowing thermoplastic melt is subsequently profiled in a flat-film nozzle in the flat-film forming tool (5) into a melt film 0.3 mm thick, which directly after exiting the die gap in the still molten state is irradiated with accelerated electrons from an electron accelerator (6). The electron energy is no more than 300 keV and the radiation dosage up to 150 kGy. The now melt-crosslinked polyethylene film is subsequently seized by the rollers of a flat-film mill (7) and cooled in a defined manner. The then solidified polyethylene film is guided through the local radiation guard (3) out of the irradiation area and wound on a reel core (8) there in the usual manner.

Example 2

Figure 2:
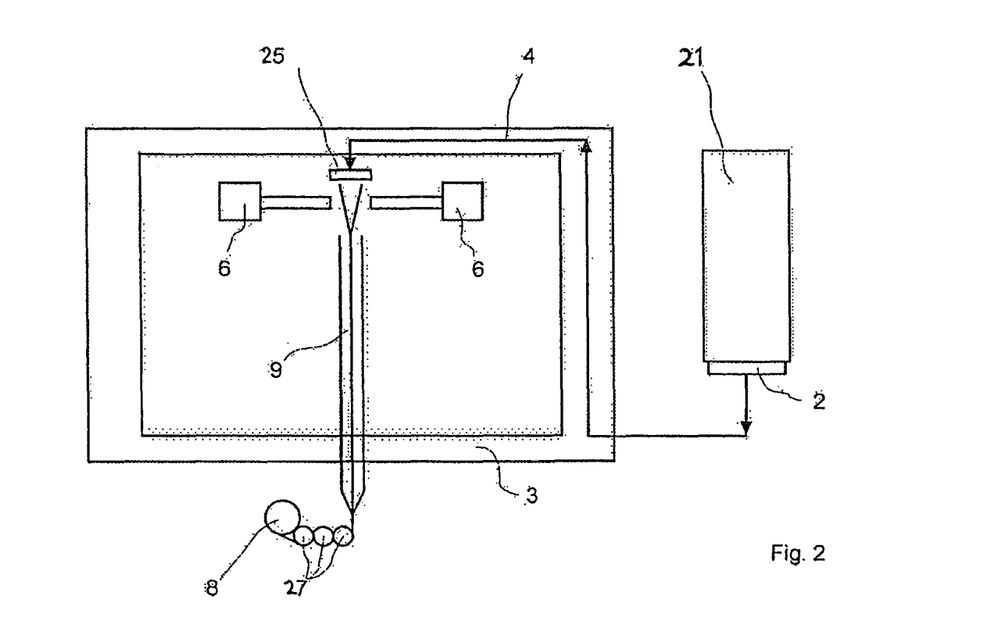

FIG. 2 shows a further exemplary embodiment of the invention. As shown in FIG. 2, a polymer melt exiting a synthesis reactor (21) is transported to the inflow opening of a heated melt gear pump (2). This melt gear pump (2) builds up the necessary melt pressure for the transport of the hot polymer melt through the melt line (4) integrated in the local radiation guard (3) up to the inlet into a conventional thread-spinning tool (25). Another gear pump (not labeled) usually integrated into the thread-spinning tool (25) seizes the arriving polymer melt and produces the necessary pressure and throughput constancy for thread-spinning processes. The polymer melt is then profiled to melt threads inside a spinneret in the thread-spinning tool (25), which threads, directly after exiting the nozzle holes in a still molten state, are irradiated from two sides with accelerated electrons from an electron accelerator (6). The electron energy is thereby no more than 1 MeV and the radiation dosage up to 500 kGy. The strands, melt-modified in this manner, are subsequently seized by the rollers of a conventional draw-off galette (27) outside the irradiation zone, drawn, cooled and wound on a reel core (8). The thread draw-off shaft (9) is partially integrated into the local radiation guard (3).

Example 3

Figure 3:
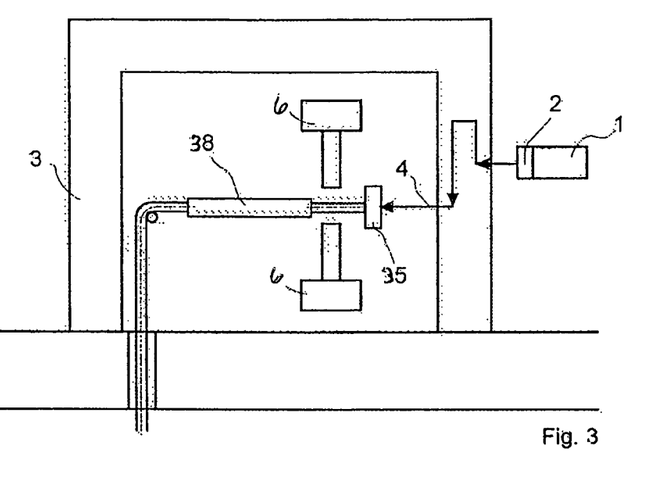

FIG. 3 shows a further exemplary embodiment of the invention. As shown in FIG. 3, polymer pellets suitable for the production of plastic pipes are melted in a single-screw extruder (1) in the usual manner. The polymer melt is transported through the rotating screw inside the single-screw extruder (1) downstream to the inflow opening of a melt gear pump (2). This melt gear pump builds up the necessary melt pressure for the transport of the hot polymer melt through the heated melt line (4) integrated into the radiation guard (3) up to a pipe-forming tool (35) inside the radiation guard (3). The polymer melt is then formed in a ring nozzle of the pipe-forming tool (35) into a pipe, which, directly after exiting the ring nozzle slot in the still molten state, is irradiated from two sides with accelerated electrons from an electron accelerator (6). The electron energy is thereby up to 10 MeV and the radiation dosage up to 150 kGy. The melt-modified plastic pipe is subsequently calibrated and cooled (38) in the usual manner. The plastic pipe, then solidified, is subsequently guided out of the irradiation area through the radiation guard (3) and, e.g., wound there to form ring coils (not shown).

Example 4

Figure 4:
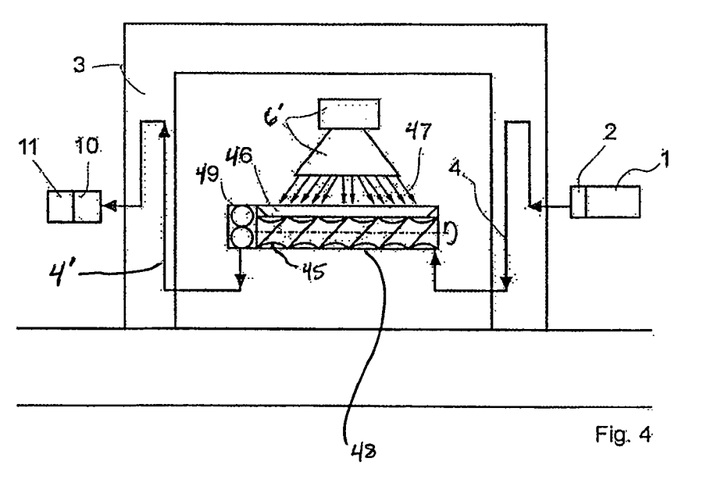

FIG. 4 shows a further exemplary embodiment of the invention. As shown in FIG. 4, pellets or powders of differing standard polymers, construction polymers and high-efficiency polymers (e.g., polypropylene (PP), polymide (PA), polyethylene terephthalate (PET), polybutylene terephthalate (PBT), (PSU), polyphenylene sulfide (PPS), polyimide (PI), polyetheretherketone (PEEK)) are melted in the usual manner in a single-screw extruder (1). However, the invention contemplates that a double-screw extruder may be used in place of the single-screw extruder. First, a polymer melt is produced through the rotating screws. Optionally, additives are added thereto and then the polymer melt is transported inside the single-screw extruder (1) downstream to the inflow opening of a melt gear pump (2). The melt gear pump (2) builds up the melt pressure that is necessary for the transport of the polymer melt through the heated melt line (4) integrated into the radiation guard (3) up to the inflow opening of an irradiation chamber (48). The irradiation chamber (48) is located thereby inside the radiation guard (3). The polymer melt is transported in the irradiation chamber (48) by closely intermeshing, self-cleaning screw shafts (45) of different screw element geometries in a pressureless manner, i.e., with filler contents under 100%, through the irradiation chamber (48). The polymer melt thereby passes a radiation window (46) over its entire length and is irradiated through it with accelerated electrons (47) from the electron accelerator (6') up to a specific total radiation dosage. The electron energy is up to 10 MeV. The rotating and closely intermeshing, self-cleaning extruder screws (45) force a plug flow, i.e., a close axial dwell time distribution and an effective mixture/homogenization of differently radiation-activated melt volumes in the polymer melt. The radiation energy absorbed in the radiation window (46) can be used for additive melt heating. The polymer melt radiation-modified in this manner is guided at the end of the irradiation chamber (48) to a further melt gear pump (49). This melt gear pump (49) builds up the melt pressure that is necessary for the transport of the now radiation-modified polymer melt through a heated melt line (4') integrated into the radiation guard (3) up to a strand-forming (or profile-forming) tool (10) outside the irradiation chamber (48). The pelletizing of the polymer strands takes place in the usual manner in an underwater pelletizer (UWP) (11), which follows the strand-forming tool (10). The pellets flowing in the UWP pellet water of the UWP (11) are thereby cooled and subsequently dewatered, dried, screened and packed in the usual manner, and can subsequently be processed with the known methods into finished plastic products.

Example 5

Figure 5:
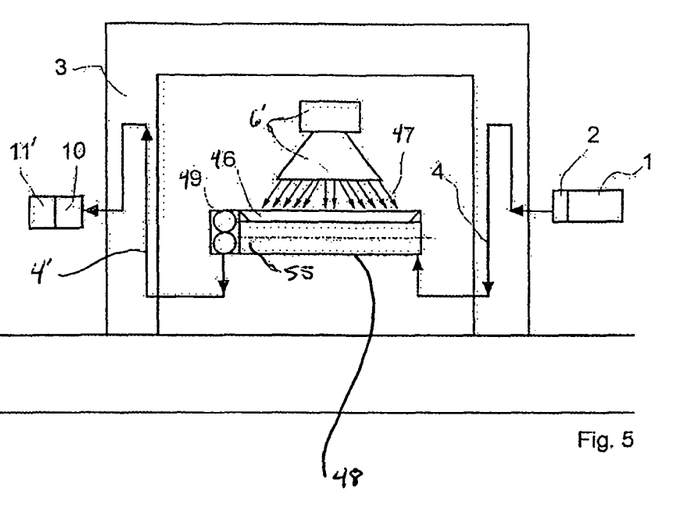

FIG. 5 shows a further exemplary embodiment of the invention. As shown in FIG. 5, pellets or powders from thermoplastics are melted in the usual manner in a single-screw extruder (1). However, the invention contemplates that a double-screw extruder may be used in place of the single-screw extruder. First, a polymer melt is produced through the rotating screws. Optionally, additives are added thereto and then the polymer melt is transported inside the single-screw extruder (1) downstream to the inflow opening of a melt gear pump (2). The melt gear pump (2) builds up the melt pressure that is necessary for the transport of the polymer melt through the heated melt line (4) integrated into the radiation guard (3) up to the inflow opening of an irradiation chamber (48). The irradiation chamber (48) is located thereby inside the radiation guard (3). In the irradiation chamber (48) the polymer melt is formed into a defined melt geometry in a channel (55) with a rectangular profile. This flowing profiled polymer melt then passes the radiation window (46) in the irradiation chamber (48) and is irradiated there with accelerated electrons (47) from the electron accelerator (6'). The electron energy is up to 10 MeV. The positively flowing profiled polymer melt is thereby radiation-modified. The radiation energy absorbed in the radiation window (46) can be effectively used for additive melt heating. The radiation-modified polymer melt is collected again at the end of the irradiation chamber (48) and fed to a further melt gear pump (49). This melt gear pump (49) builds up the necessary melt pressure for the transport of the polymer melt through heated melt line (4') integrated into the radiation guard (3) up to a strand-forming tool (10) outside the irradiation chamber (48). The pelletization of the polymer strand takes place in the following metering roll pelletizer (11'). The pellets subsequently dewatered, dried, screened and packed in the usual manner, and can now be processed with the known methods into finished plastic products.

Example 6

In accordance with a further exemplary embodiment, a rubber compound, which can be radiation-crosslinked but is still uncrosslinked, produced on an internal mixer is melted on a conventional single-screw rubber press. The compound usually comprises 100 parts by weight (pbw) rubber polymers, 0 to 90 parts by weight fillers, 0 to 50 parts by weight plasticizers, 0 to 10 parts by weight processing aids, 0 to 2 parts by weight age-protecting agents and the usual proportions of crosslinking chemicals (e.g., peroxide or sulfur, conventional accelerators, such as MBTS; vulcanization assistants such as zinc oxide and stearic acid [see, e.g., W. Hofmann, Rubber Technology Handbook, Hanser Publishers, Munich, Vienna, New York, 1989]. The rubber polymers, which are used alone or in the form of blends (preferably of 2 to 3 polymers), are conventional types (see, e.g., W. Hofmann, Rubber Technology Handbook, Hanser Publishers, Munich, Vienna, New York, 1989] such as, e.g., NBRs, H-NBRs, EPDMs, fluorocarbon polymers, NR, BR, SBR types, etc. The fillers are generally carbon black, loaded silica in combination with silanization chemicals (e.g., a tetrasulfane, such as Si 69), or newer fillers, such as unmodified or modified phylosilicates.

With this example, the rubber compound is a fully compounded stock, on which a conventional chemical crosslinking can also be carried out in addition to the radiation crosslinking. In this case, the melting and vulcanization temperature and the quantity of the crosslinking chemicals are coordinated with one another according to the purpose of use for the crosslinking achievable with the respective radiation dosage. The flowable rubber compound is subsequently transported from a gear pump through a heated line for the melt integrated into the radiation guard up to a profile-forming tool inside the radiation guard. The flowable rubber compound is subsequently formed in the profile nozzle of a forming tool into a lip-seal profile (with the usual dimensions, e.g., width 8 mm to 20 mm and height 7 mm to 50 mm), which is irradiated with accelerated electrons immediately after exiting from the profile nozzle slot in the still flowable state. The electron energy is 10 MeV and the radiation dosage 500 kGy. The now radiation-crosslinked lip-seal profile is then guided through the radiation guard out of the irradiation chamber and deposited or wound there in the usual manner. In contrast to solids irradiation, the direct electron irradiation of the still flowable rubber compound leads to denser and more homogeneous network structures, and thus, to a higher strength combined with a greater working life.

Example 7

In accordance with a further exemplary embodiment, a rubber compound, which can be radiation-crosslinked but is still uncrosslinked, produced on an internal mixer is melted on a conventional single-screw rubber press. The compound usually comprises 100 parts by weight (pbw) rubber polymers, 0 to 90 parts by weight fillers, 0 to 50 parts by weight plasticizers, 0 to 10 parts by weight processing aids, 0 to 2 parts by weight age-protecting agents and the usual proportions of crosslinking chemicals (e.g., peroxide or sulfur, conventional accelerators, such as dibenzothiazole disulphide (MBTS); vulcanization assistants such as zinc oxide and stearic acid [see, e.g., W. Hofmann, Rubber Technology Handbook, Hanser Publishers, Munich, Vienna, New York, 1989]. The rubber polymers, which are used alone or in the form of blends (preferably of 2 to 3 polymers), are conventional types (see, e.g., W. Hofmann, Rubber Technology Handbook, Hanser Publishers, Munich, Vienna, New York, 1989] such as, e.g., nitrile butadiene rubbers (NBRs), hydrogenated nitrile butadiene rubbers (H-NBRs), ethylene propylene diene M-class rubber (EPDMs), fluorocarbon polymers, nitrile rubber (NR), butadiene rubber (BR), styrene-butadiene rubber (SBR) types, etc. The fillers are generally carbon black, loaded silica in combination with silanization chemicals (e.g., a tetrasulfane, such as Bis(triethoxysilylpropyl) polysulfide (Si 69®)), or newer fillers, such as unmodified or modified phylosilicates. (Si 69 is a registered trademark of Degussa-Huls Aktiengesellschaft in the United States, other countries or both.)

With this example, the now flowable rubber compound is subsequently transported from a gear pump through the heated line for the melt integrated into the radiation guard and up to a profile-forming tool inside the radiation guard. The flowable rubber compound is subsequently formed in the profile nozzle of a forming tool into a tube or seal profile, which is irradiated with differently accelerated electrons immediately after exiting from the profile nozzle slot and in the still flowable state. The electron energy of the first irradiation is 10 MeV and the radiation dosage 500 kGy. Moreover, the first irradiation generates the most homogenous possible basic crosslinking over the entire profile cross section. The electron energy of a second irradiation immediately following is 200 keV and generates an additional crosslinking exclusively in the already pre-crosslinked profile surface. The tube or seal profiles gradient-crosslinked in this manner are guided out of the irradiation area through the radiation guard and deposited or wound there in the usual manner. The sequential gradient-crosslinking in the flowable state of the rubber compound leads to a much improved mechanical, in particular tribological behavior.

Example 8

Polyethylene films melt-crosslinked according to example 1 are seized by heated rollers directly after their melt irradiation in the still warm state, drawn off, tempered and axially stretched. Cooled rollers subsequently ensure the film solidification. The then solidified and crosslinked polyethylene film is guided out of the irradiation chamber through a local radiation guard and wound there in the usual manner. Thus, in accordance with aspects of the invention, through the combination of crosslinking and axial stretching directly following one another at increased temperatures, different types of polyethylene shrink films are produced in a single process step.

Example 9

Polyethylene films melt-crosslinked according to example 1 are seized by a clamping frame of a type known per se directly after the melt irradiation in the still warm state, and drawn off, tempered and biaxially stretched therein, whereby the biaxial stretching can be carried out both simultaneously as well as sequentially. The polyethylene film crosslinked and stretched in this manner is deneedled from the clamping frame, guided out of the irradiation chamber through a local radiation guard and wound there in the usual manner. Thus, in accordance with aspects of the invention, through the combination of melt crosslinking and biaxial stretching directly following one another at increased temperatures, different types of polyethylene shrink films are produced in a single process step.

| List of Reference Numbers | |
| --- | --- |
| 1 | Device component for converting the polymers into the flowable state |
| 2 | Gear pump |
| 3 | Radiation guard |
| 4 | Supply line |
| 4' | Discharge line |
| 5 | Forming tool |
| 6 | Irradiation device for electron radiation |
| 6' | Irradiation device for electron radiation |
| 7 | Rollers |
| 8 | Reel core |
| 9 | Thread draw-off shaft |
| 10 | Strand-forming (profile-forming) tool |
| 11 | Under water pelletizer |
| 11' | Metering roll pelletizer |
| 21 | Synthesis reactor |
| 25 | Thread spinning tool |
| 27 | Draw-off galette |
| 35 | Pipe-forming tool |
| 38 | Cooler |
| 45 | Self-cleaning screw shafts |
| 46 | Radiation window |
| 47 | Accelerated electrons |
| 48 | Irradiation chamber |
| 49 | Melt gear pump |
| 55 | Channel |

The invention claimed is:

1. An apparatus for a continuous modification of polymers in a flowable state by electron radiation, comprising:
a device configured for converting polymers into the flowable state;
a gear pump arranged after the device configured for converting the polymers into the flowable state; a radiation guard;
a forming device within the radiation guard;
at least one irradiation device within the radiation guard that is structured and arranged to provide electron radiation in a region of irradiation, wherein the at least one irradiation device comprises an irradiation chamber having a radiation window structured and arranged inside the radiation guard;
a second gear pump arranged immediately after the region of irradiation and within the radiation guard; and
supply and discharge lines inside the radiation guard;
wherein the supply and discharge lines realize a continuous transport of the polymers in the flowable state at least through the radiation guard, wherein the supply and discharge lines are configured for heating, and wherein, in the case of polymers remaining flowable and modified at least inside the radiation guard, the modification of the polymers in the flowable state takes place within the irradiation chamber.

2. The apparatus of claim 1, wherein the device configured for converting the polymers into the flowable state is one of:
an extruder;
an internal mixer; and
a synthesis reactor.

3. The apparatus of claim 1, wherein the device configured for converting the polymers into the flowable state is arranged outside the radiation guard.

4. The apparatus of claim 1, wherein the radiation guard is composed of one of:
a material comprising at least one of iron, lead and tungsten; and
concrete.

5. The apparatus of claim 1, wherein the irradiation device is arranged at least one of above, below and to the side of the region of irradiation.

6. The apparatus of claim 1, wherein the radiation window located inside the radiation guard and is one of above, below and adjacent the region of irradiation.

7. The apparatus of claim 1, further comprising at least one of a pelletizing device, a winding device, a severing device and a transporting device, wherein the at least one of the pelletizing device, the winding device, the severing device and the transporting device is one of inside the radiation guard and outside the radiation guard.

8. The apparatus of claim 1, further comprising pipes structured and arranged for transporting the polymers in the flowable state.

9. The apparatus of claim 1, further comprising openings in the radiation guard for the supply and discharge lines, wherein the openings are structured and arranged to prevent any direct optical view of the region of irradiation.

10. The apparatus of claim 1, wherein the irradiation chamber further comprises at least one of a transport device and a mixing device.

11. The apparatus of claim 1, wherein geometric dimensions of the irradiation chamber generate a melt profile of the polymers in the flowable state in the irradiation chamber.

12. The apparatus of claim 11, wherein the irradiation chamber comprises a rectangular cross section channel structured and arranged to provide the polymers in the flowable state with a film form in the region of the irradiation.

13. The apparatus of claim 1, wherein the radiation guard with the supply and discharge lines is integrated into a continuous production process for polymers.

14. The apparatus of claim 1, wherein the forming device comprises one of:
a flat-film forming device;
a thread-spinning tool;
a pipe-forming tool;
self-cleaning screw shafts; and
a channel.

15. A method for a continuous modification of polymers in a flowable state by electron radiation, comprising:
converting polymers into the flowable state;
transporting the polymers in the flowable state through a gear pump arranged after a device configured for the converting the polymers into the flowable state;
continuously transporting the polymers in the flowable state via a supply line to a forming device, at least one irradiation device providing a region of irradiation, and a second gear pump arranged immediately after the region of irradiation, all of which are located inside a radiation guard, wherein the at least one irradiation device comprises an irradiation chamber having a radiation window structured and arranged inside the radiation guard;
modifying the polymers in the flowable state by providing electron radiation to the polymers in the flowable state in the region of irradiation;
and one of:
providing a continuous transport of polymers remaining in the flowable state and modified at least inside the radiation guard out of the radiation guard via a discharge line; and
providing a continuous transport of solid formed and modified polymers out of the radiation guard via the discharge line,
wherein the supply and discharge lines are configured for heating, and
wherein, in the case of polymers remaining flowable and modified at least inside the radiation guard, the modification of the polymers in the flowable state takes place within the irradiation chamber.

* * * * *